US010365936B2

(12) United States Patent
van Riel et al.

(10) Patent No.: US 10,365,936 B2
(45) Date of Patent: Jul. 30, 2019

(54) IDLE PROCESSOR MANAGEMENT BY GUEST IN VIRTUALIZED SYSTEMS

(71) Applicant: Red Hat Israel, Ltd., Raanana (IL)

(72) Inventors: Henri Han van Riel, Westford, MA (US); Michael Tsirkin, Yokeneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 218 days.

(21) Appl. No.: 14/191,856

(22) Filed: Feb. 27, 2014

(65) Prior Publication Data
US 2015/0242229 A1  Aug. 27, 2015

(51) Int. Cl.
G06F 9/455 (2018.01)

(52) U.S. Cl.
CPC .................. G06F 9/45545 (2013.01)

(58) Field of Classification Search
CPC .................................................. G06F 9/45545
See application file for complete search history.

(56) References Cited

U.S. PATENT DOCUMENTS

| 8,191,062 | B2 | 5/2012 | Grobman |
| 8,296,761 | B2 | 10/2012 | Ueno et al. |
| 8,296,767 | B1 | 10/2012 | Waldspurger et al. |
| 8,341,628 | B2 | 12/2012 | Arndt et al. |
| 8,364,997 | B2 | 1/2013 | Tian et al. |
| 8,539,010 | B2 | 9/2013 | Inakoshi |
| 8,887,171 | B2 | 11/2014 | Song et al. |
| 9,310,864 | B1 | 4/2016 | Klein et al. |
| 2007/0028244 | A1 | 2/2007 | Landis et al. |
| 2010/0115315 | A1 | 5/2010 | Davis et al. |
| 2010/0218183 | A1* | 8/2010 | Wang ..................... G06F 1/3228 718/1 |
| 2010/0257524 | A1* | 10/2010 | Weissman ............... G06F 9/485 718/1 |
| 2011/0010713 | A1 | 1/2011 | Matsumoto et al. |
| 2011/0119422 | A1* | 5/2011 | Grouzdev .............. G06F 9/4881 710/262 |

(Continued)

OTHER PUBLICATIONS

Vijayrajan, P., "Analysis of Performance in the Virtual Machines Environment", International Journal of Advanced Science and Technology, Jul. 2011, pp. 53-64, vol. 32.

(Continued)

*Primary Examiner* — Hang Pan
(74) *Attorney, Agent, or Firm* — Womble Bond Dickinson (US) LLP; Daniel E. Ovanezian (57) ABSTRACT

A system and method for idle processor management in virtualized systems are disclosed. In accordance with one embodiment, a guest operating system (OS) of a virtual machine estimates an idle time for a virtual central processing unit (CPU) of the virtual machine, where the virtual machine is executed by a CPU of a host computer system, and where the virtual CPU is mapped to the CPU. The guest OS also estimates a host latency time for the host computer system, where the host latency time is based on at least one of: a first power state of the CPU, a context switch associated with execution of the virtual machine by the CPU, or an idle state of a hypervisor executed by the CPU. When the idle time for the virtual CPU divided by a performance multiplier exceeds the host latency time, the virtual CPU is caused to halt.

18 Claims, 4 Drawing Sheets

(56) References Cited

U.S. PATENT DOCUMENTS

| | | | |
|---|---|---|---|
| 2011/0154323 A1* | 6/2011 | Arndt | G06F 9/45533 718/1 |
| 2011/0161627 A1 | 6/2011 | Song et al. | |
| 2011/0213997 A1 | 9/2011 | Kansal et al. | |
| 2011/0246800 A1 | 10/2011 | Accpadi et al. | |
| 2013/0290752 A1 | 10/2013 | Jones et al. | |
| 2013/0346766 A1 | 12/2013 | Tani | |
| 2014/0137105 A1 | 5/2014 | Garg et al. | |
| 2014/0143774 A1* | 5/2014 | Adams | G06F 9/45558 718/1 |
| 2014/0149988 A1* | 5/2014 | Huang | G06F 9/485 718/102 |
| 2014/0181811 A1 | 6/2014 | Tsirkin | |
| 2014/0254369 A1 | 9/2014 | Kulkarni | |
| 2014/0281629 A1 | 9/2014 | Bose et al. | |
| 2015/0058846 A1* | 2/2015 | Zheng | H04L 47/56 718/1 |
| 2015/0169036 A1 | 6/2015 | Sodhi et al. | |
| 2015/0193249 A1 | 7/2015 | van Riel et al. | |
| 2015/0242229 A1 | 8/2015 | van Riel et al. | |
| 2015/0339155 A1 | 11/2015 | Tsirkin | |
| 2015/0347171 A1 | 12/2015 | Tsirkin | |
| 2016/0203012 A1 | 7/2016 | Dong et al. | |
| 2017/0091357 A1 | 3/2017 | Brock et al. | |

OTHER PUBLICATIONS

Song, X et al., "Characterizing the Performance and Scalability of Many-core Applications on Virtualized Platforms", Prallel Processing Institute Technical Report No. FDUPPITR-2010-002, Nov. 2010, 17 pages, Shanghai, China.

Cheng, L., et al., "vBalance: Using Interrupt Load Balance to Improve I/O Performance for SMP Virtual Machines", Proceedings of the Third ACM Symposium on Cloud Computing, Oct. 14-17, 2012, 14 pages, San Jose, California.

USPTO, Non-Final Office Action for U.S. Appl. No. 14/149,061 dated Oct. 7, 2015.

USPTO, Non-Final Office Action for U.S. Appl. No. 14/149,061 dated May 3, 2016.

USPTO, Final Office Action for U.S. Appl. No. 14/149,061 dated Nov. 1, 2016.

USPTO, Non-Final Office Action for U.S. Appl. No. 14/149,061 dated May 16, 2017.

* cited by examiner

IDLE PROCESSOR MANAGEMENT BY GUEST IN VIRTUALIZED SYSTEMS

TECHNICAL FIELD

This disclosure relates to computer systems, and more particularly, to virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine" or a "physical machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual central processing units (CPUs)," each of which maps, possibly in a many-to-one fashion, to a CPU of the host machine. Similarly, a virtual machine may comprise one or more "virtual devices," each of which maps to a device of the host machine (e.g., a network interface device, a CD-ROM drive, etc.). For example, a virtual machine may comprise a virtual disk that is mapped to an area of storage (known as a "disk image") of a particular storage device (e.g., a magnetic hard disk, a Universal Serial Bus [USB] solid state drive, a Redundant Array of Independent Disks [RAID] system, a network attached storage [NAS] array, etc.) The hypervisor manages these mappings in a transparent fashion, thereby enabling the guest operating system and applications executing on the virtual machine to interact with the virtual CPUs and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and method for idle processor management in virtualized systems. In accordance with one embodiment, a guest operating system (OS) of a virtual machine estimates an idle time for a virtual CPU of the virtual machine, where the virtual machine is executed by a CPU of a host computer system, and where the virtual CPU is mapped to the CPU. The guest OS also estimates a host latency time for the host computer system, where the host latency time is based on at least one of: a power state of the CPU, a context switch associated with execution of the virtual machine by the CPU, or an idle state of a hypervisor executed by the CPU. When the idle time for the virtual CPU divided by a performance multiplier exceeds the host latency time, the virtual CPU is halted. It should be noted that the term "time" is used throughout this disclosure to refer to a time duration (e.g., 10 milliseconds, etc.) and not to a particular point in time (e.g., HH:MM:SS:mmm, etc.).

In accordance with one embodiment, the guest OS estimates a plurality of such host latency times, corresponding to a plurality of possible CPU power states, where the estimated host latency time for a particular CPU power state is based on one or both of: a time for the CPU to enter the particular power state and a time for CPU 160 to exit the particular CPU power state. In one implementation, the estimated host latency time for one or more of the power states of the CPU may optionally be further based on at least one of:

one or more context switch times for the CPU to execute the guest (e.g., a time for the CPU to enter execution of the virtual machine, a time for the CPU to exit execution of the virtual machine, etc.); or one or more idle state times for a hypervisor run by the CPU (e.g., a time for the hypervisor to enter its idle state, a time for the hypervisor to exit its idle state, etc.)

In one embodiment, the guest OS selects the "deepest" possible CPU power state, which is the power state having the largest host latency time that satisfies the inequality:

$$(\text{idle time/performance multiplier}) > \text{host latency time}.$$

where the performance multiplier is a value that may be based on an average load of the CPU, or a number of input/output wait tasks of the CPU, or both. In accordance with some embodiments, the CPU complies with the Advanced Configuration and Power Interface (ACPI) standard for device configuration and power management. In such embodiments, the CPU can occupy one of four ACPI processor states: C0, C1, C2, and C3.

In accordance with some embodiments of the present disclosure, the guest operating system is paravirtualized to provide one or more of the functions described above. Paravirtualization is a technique by which a guest operating system is modified and recompiled to execute on top of a hypervisor.

Embodiments of the present disclosure thus enable a guest OS to contribute to the CPU management activities of the underlying host system. This capability can reduce host power consumption, as well as potentially improve host system performance via accurate host latency estimates. Moreover, these benefits can be realized in host systems employing hypervisors that lack sophisticated CPU management capabilities.

Figure 1:
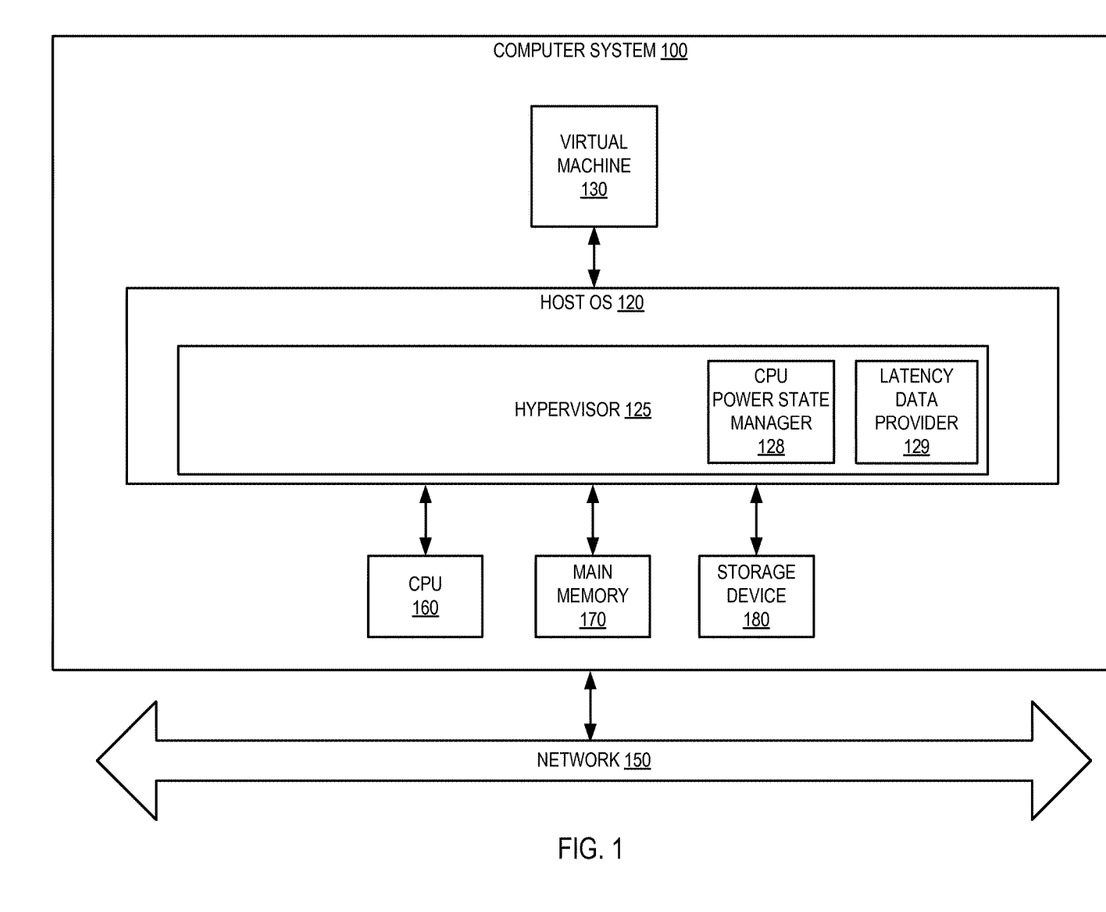
FIG. 1 depicts an illustrative computer system architecture, in accordance with an embodiment of the present disclosure.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, the computer system 100 is connected to a network 150 and comprises central processing unit (CPU) 160, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.) that serves as a secondary memory, interconnected as shown. The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 runs a host operating system (OS) 120, which comprises software, hardware, or both, that manages the hardware resources of the computer system and that provides functions such as interprocess communication, scheduling, virtual memory management, and so forth. In some examples, host operating system 120 also comprises a hypervisor 125, which provides a virtual operating platform for virtual machine 130 and that manages its execution. In accordance with one such example, hypervisor 125 includes a CPU power state manager 128 and a latency data provider 129. In one embodiment, CPU power state manager 128 is capable of receiving requests to place CPU 160 in a particular power state (e.g., from VM 130, etc.) and of fulfilling such requests, and latency data provider 129 is capable of providing one or more individual latency times (described in detail below with respect to FIG. 3), or a sum of two or more of these latency times, to one or more virtual machines. In one implementation, latency data provider 129 is also capable of providing the value of a performance multiplier to one or more virtual machines. It should be noted that in some other examples, hypervisor 125 may be external to host OS 120, rather than embedded within host OS 120.

Virtual machine 130 is a software implementation of a machine that executes programs as though it were an actual physical machine. It should be noted that although, for simplicity, a single virtual machine is depicted in FIG. 1, in some other embodiments computer system 100 may host a plurality of virtual machines. Virtual machine 130 is described in more detail below with respect to FIG. 2.

Figure 2:
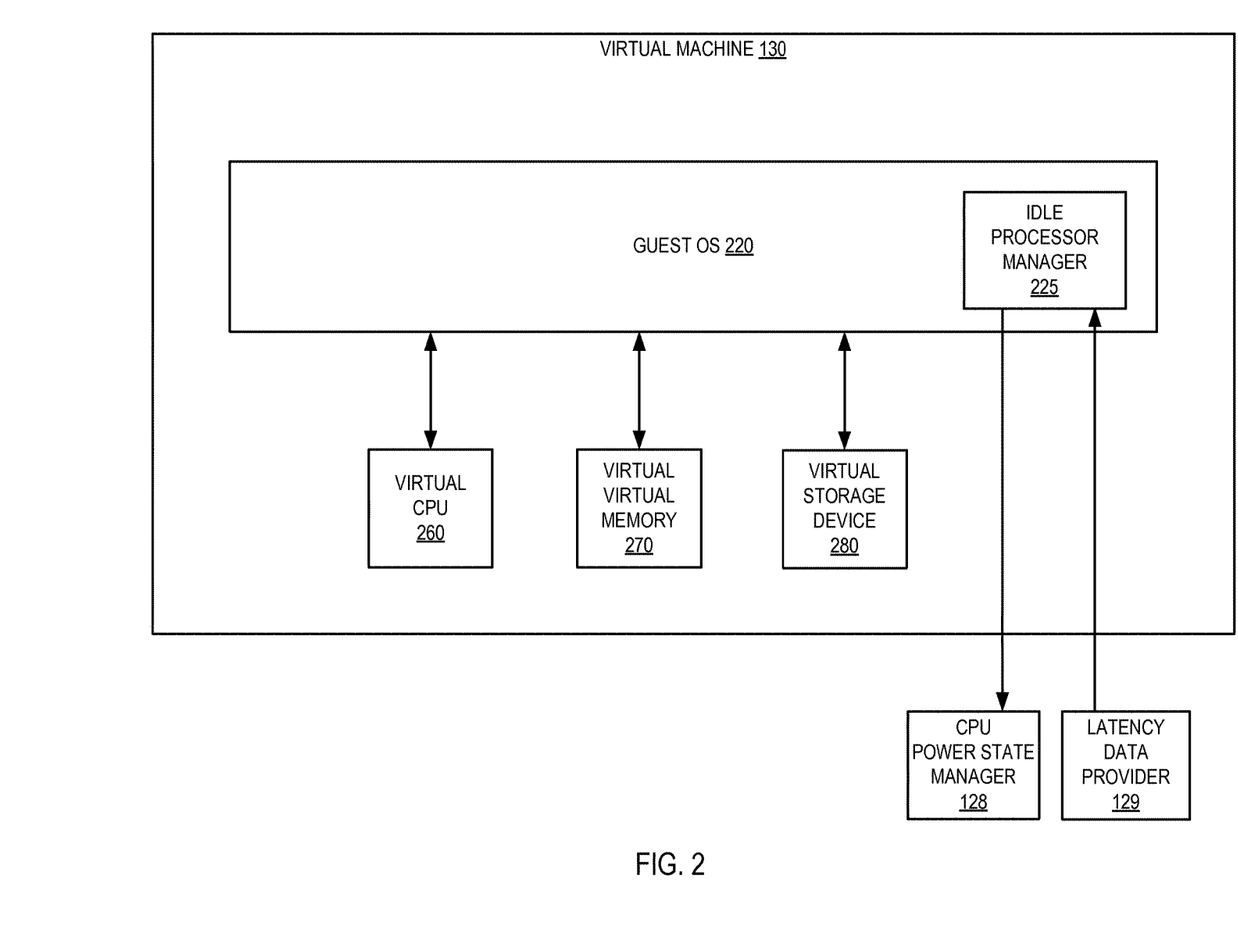
FIG. 2 depicts a block diagram of elements of a virtual machine, in accordance with an embodiment of the present disclosure.

FIG. 2 depicts a block diagram of elements of virtual machine 130, in accordance with an embodiment of the present disclosure. As shown in FIG. 2, virtual machine 130 comprises a guest operating system 220, a virtual CPU 260, a virtual virtual memory 270, and a virtual storage device 280.

Virtual CPU 260 emulates a physical CPU and maps to central processing unit (CPU) 160; similarly, virtual storage device 280 emulates a physical storage device and maps to storage device 180. Virtual virtual memory 270 maps virtual addresses of virtual machine 130 to addresses of the host OS 120's virtual memory, which in turn maps to physical addresses in main memory 170. In one embodiment, hypervisor 125 manages these mappings in a transparent fashion, so that guest OS 220 and applications executing on virtual machine 130 interact with virtual CPU 260, virtual virtual memory 270, and virtual storage device 280 as though they were actual physical entities. As noted above, in embodiments where computer system 100 comprises a plurality of CPUs 160, rather than a single CPU, virtual machine 130 may also comprise a plurality of virtual CPUs 260. Similarly, in embodiments where computer system 100 comprises a plurality of storage devices 180, rather than a single storage device, virtual machine 130 may also comprise a plurality of storage devices 180.

Guest operating system (OS) 220 manages virtual machine resources and provides functions such as interprocess communication, scheduling, memory management, and so forth. In accordance with one embodiment, guest OS 220 is modified via paravirtualization to include an idle processor manager 225 that is capable of obtaining individual latency times, sums of individual latency times, and performance multiplier values; of determining when virtual CPU 260 will be idle; of estimating idle times for virtual CPU 260; of estimating host latency times; of selecting CPU power states; and of sending requests to hypervisor 125 to place CPU 160 in particular power states; as described in detail below with respect to FIG. 3.

Figure 3:
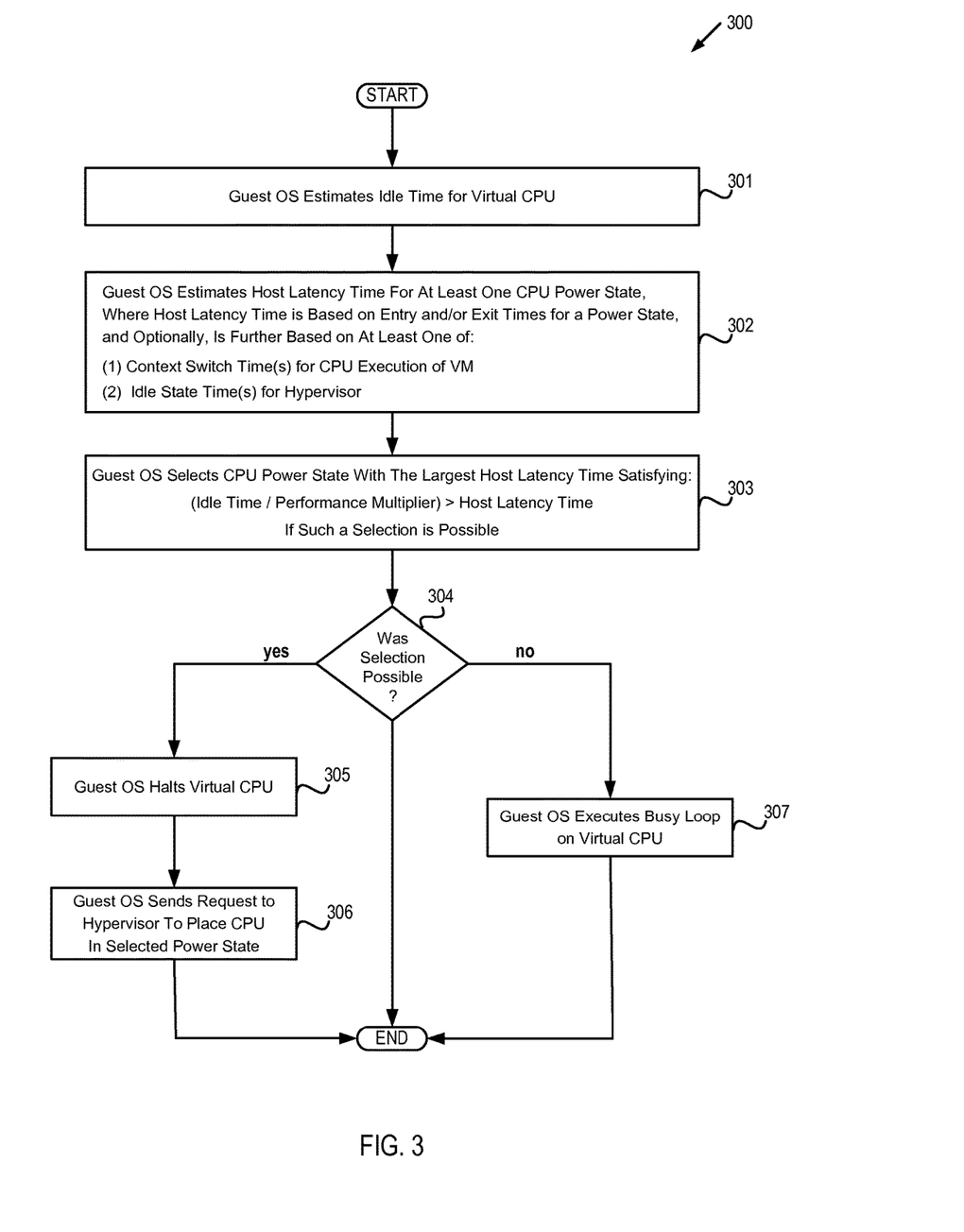
FIG. 3 depicts a flow diagram of one example of a method by which a guest operating system (OS) handles an idle virtual CPU.

FIG. 3 depicts a flow diagram of one example of a method 300 by which a guest operating system (OS) handles an idle virtual CPU. The method is performed by processing logic that may comprise hardware (circuitry, dedicated logic, etc.), software (such as is run on a general purpose computer system or a dedicated machine), or a combination of both. In one embodiment, the method is performed by guest OS 220 of computer system 100, and more particularly, by idle processor manager 225 of guest OS 220, while in some other embodiments, the method may be performed by another guest OS of computer system 100, or by a guest OS hosted by some other machine. It should be noted that in some other embodiments blocks depicted in FIG. 3 may be performed simultaneously or in a different order than that depicted.

At block 301, guest OS 220 of virtual machine 130 estimates an idle time for virtual CPU 260 (e.g., based on the state of one or more processes managed by guest OS 220, based on historical data, etc.). At block 302, guest OS 220 estimates a host latency time for at least one power state of CPU 160. In one embodiment, the estimated host latency time for a particular CPU power state is based on one or both of: a time for CPU 160 to enter the particular CPU power state (also referred to as "an entry time for the power state"), and a time for CPU 160 to exit the particular CPU power state (also referred to as "an exit time for the power state"). In one implementation, the estimated host latency time for one or more of the power states of CPU 160 may optionally be further based on at least one of:

one or more context switch times for execution of VM 130 by CPU 160 (e.g., a time for CPU 160 to enter execution of VM 130, a time for CPU 160 to exit execution of VM 130, etc.); or one or more idle state times for hypervisor 125 (e.g., a time for hypervisor 125 to enter its idle state, a time for hypervisor 125 to exit its idle state, etc.)

In one embodiment, CPU 160 complies with the Advanced Configuration and Power Interface (ACPI) standard for device configuration and power management and can occupy one of four ACPI processor states: C0, C1, C2 and C3.

In some embodiments, one or more of the times upon which the host latency time(s) are based may be hard-coded in guest OS 220, or may be stored in one or more designated locations (e.g., one or more registers, one or more configuration files, one or more tables in read-only or random-access memory, etc.), or both. In some embodiments, one or more of these times may be provided to guest OS 220 by hypervisor 125 (e.g., via a message from latency data provider 129 to idle processor manager 225, via shared memory, etc.), either individually or as a sum of the individual times, and either instead of the mechanisms described above or in combination with the mechanisms described above (as an example of the latter, the CPU power state entry/exit times could be hard-coded in guest OS 220, while the context switch times could be stored in respective registers, while the hypervisor enter/exit idle state times could be provided to guest OS 220 via a message from hypervisor 125).

At block 303, guest OS 220 selects the CPU power state with the largest host latency time satisfying: (idle time/performance multiplier)>host latency time, when such a selection is possible (i.e., when at least one of the host latency times estimated at block 302 satisfies the inequality). In other words, guest OS 220 selects a power state P of CPU 160 such that:
  (i) the host latency time of the power state P is less than (idle time/performance multiplier); and
  (ii) if any other power state has a host latency time less than (idle time/performance multiplier), then this host latency time is less than or equal to the power state P's host latency time.

Thus, guest OS 220 selects the "deepest" possible power state at block 302. When CPU 160 complies with the ACPI standard, guest OS 220 selects one of the four ACPI processor states C0, C1, C2 and C3.

In some embodiments, the performance multiplier may be computed by hypervisor 125 and provided to guest OS 220 (e.g., via a message from latency data provider 129 to idle processor manager 225, etc.), while in some other embodiments, guest OS 220 may obtain the performance multiplier in some other fashion (e.g., guest OS 220 receiving the performance multiplier from some other entity, guest OS 220 itself estimating the performance multiplier, etc.).

In one implementation, the performance multiplier may be based on an average load of CPU 160, while in some other implementations, the performance multiplier may be based on the number of input/output wait (I/O) tasks of CPU 160, while in yet other implementations, the performance multiplier may be based on both the average load and the number of I/O wait tasks. In one implementation, the performance multiplier is computed according to the equation:

$$m = a + b \cdot \lambda + c \cdot \omega$$

where $\lambda$ is the average load of CPU 160, $\omega$ is the number of I/O wait tasks of CPU 160, and a, b, and c are positive real numbers. It should be noted that in some embodiments the average load may be a simple (i.e., "plain vanilla") average over a given time interval, while in some other embodiments the average load may be another type of average (e.g., a weighted average, an exponential time-decayed average, etc.).

Block 304 branches based on whether a selection was possible at block 303. If so, execution proceeds to block 305, otherwise execution proceeds to block 307.

At block 305, guest OS 220 halts virtual CPU 260. At block 306, guest OS 220 sends a request to hypervisor 125 to place CPU 160 in the power state selected at block 303. In one implementation, idle processor manager 225 of guest OS 220 sends the request to CPU power state manager 128 of hypervisor 125.

At block 307, guest OS 220 executes a busy loop on virtual CPU 260. It should be noted that while method 300 is depicted in FIG. 3 as being executed a single time, in some embodiments method 300 may execute in an iterative fashion (e.g., execution continuing back at block 301 after block 307 has been executed, execution continuing back at block 301 after (a) block 306 has been executed and (b) guest OS 220 determines that virtual CPU 260 should no longer be idle, etc.).

Figure 4:
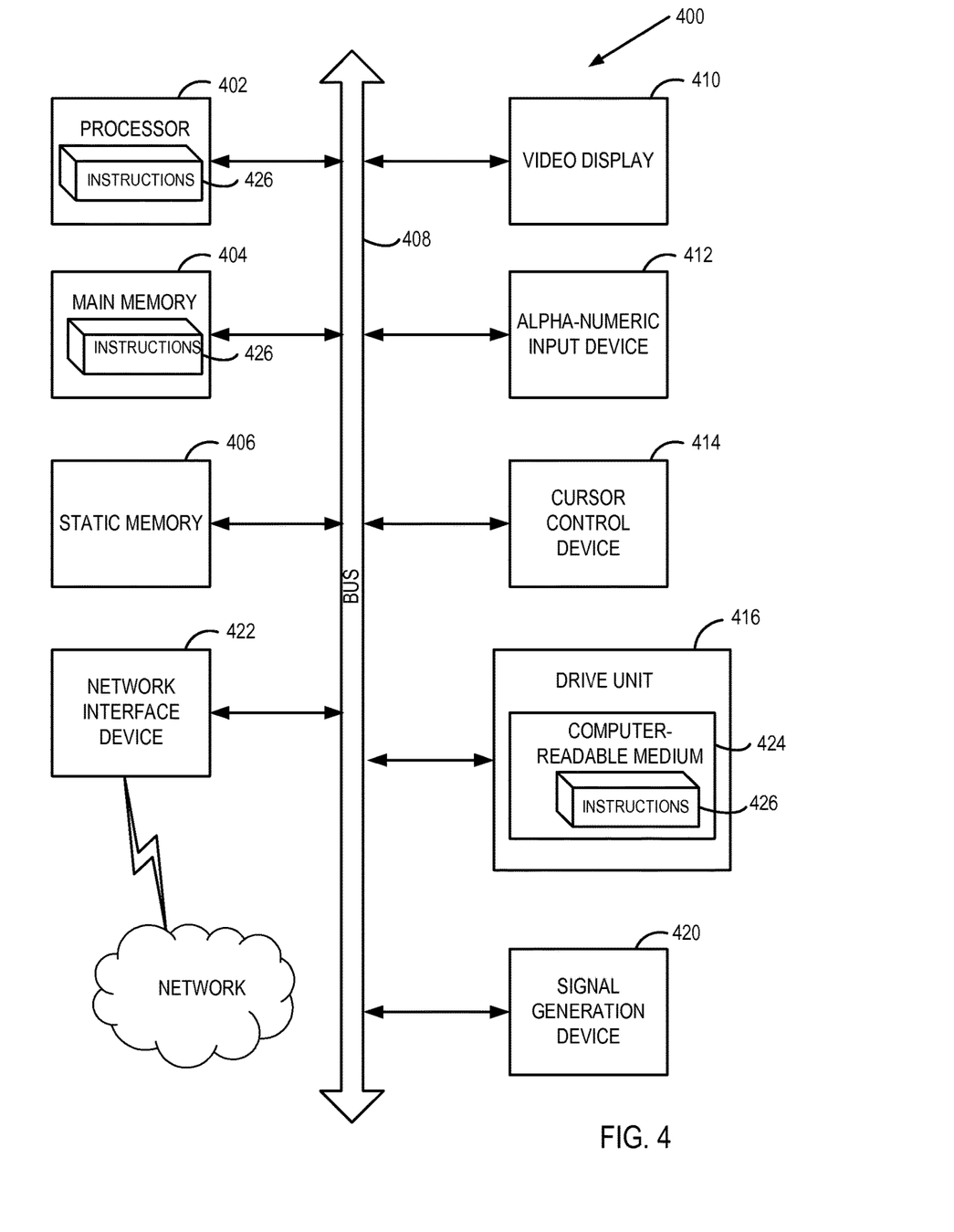
FIG. 4 depicts a block diagram of an illustrative computer system operating in accordance with embodiments of the disclosure.

FIG. 4 illustrates an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 400 includes a processing system (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 406.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to method 300 of FIG. 3, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "executing," "estimating," "halting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying, by a processing device, a first virtual central processing unit (vCPU) and a second vCPU of a virtual machine (VM), wherein the first vCPU and the second vCPU are mapped to a central processing unit (CPU) of a host computer system;
   determining, by the processing device, an amount of time that the first vCPU is to be idle;
   determining, by the processing device, a host latency time for the host computer system in view of at least one of: a context switch associated with execution of the VM by the CPU, or an idle state of a hypervisor executed by the CPU;
   modifying the amount of time the first vCPU is to be idle by a performance multiplier corresponding to an average load of the CPU; and
   responsive to determining that the amount of time the first vCPU is to be idle modified by the performance multiplier exceeds the host latency time, halting, by the processing device, the first vCPU while the second vCPU executes a request to place the CPU in a selected power state, wherein the selected power state satisfies at least one of the following conditions: that the idle time for the first vCPU divided by the performance multiplier does not exceed an exit time of the selected power state, or that the idle time for the first vCPU divided by the performance multiplier exceeds the exit time of the selected power state by a first positive delta.

2. The method of claim 1, wherein the host latency time is a sum of at least two of the following times: a time for entering a first power state of the CPU, a time for exiting the first power state, a time for entering execution of the VM by the CPU, a time for exiting execution of the VM by the CPU, a time for the hypervisor to enter the idle state, or a time for the hypervisor to exit the idle state.

3. The method of claim 2, wherein the sum is provided to the guest operating system by the hypervisor.

4. The method of claim 2, wherein at least one of the times in the sum is provided to the guest operating system by the hypervisor.

5. The method of claim 1, further comprising:
determining that the idle time for the first vCPU divided by the performance multiplier exceeds the host latency time; and
responsive to the determining, sending to the hypervisor a request to place the CPU in a first power state.

6. The method of claim 1, further comprising:
determining that the idle time for the first vCPU divided by the performance multiplier does not exceed the host latency time; and
responsive to the determining, executing a busy loop on the first vCPU.

7. The method of claim 1, wherein the idle time for the first vCPU divided by the performance multiplier exceeds an exit time of a first power state of the CPU by a second positive delta and the first power state is one of a plurality of power states of the CPU also comprising the selected power state, the selected power state being different than the first power state, and wherein the selected power state of the plurality of power states satisfies a condition the idle time for the first vCPU divided by the performance multiplier exceeds the exit time of the selected power state by the first positive delta that is at least as great as the second positive delta.

8. The method of claim 5, wherein the first power state is at least one of Advanced Configuration and Power Interface (ACPI) state C0, API state C1, ACPI state C2, or ACPI state C3.

9. The method of claim 1, further comprising determining a difference between the host latency time and a quotient of the idle time for the first vCPU divided by the performance multiplier.

10. A host computer system comprising:
a memory to store a virtual machine (VM); and
a central processing device (CPU), operatively coupled to the memory, to:
identify a first virtual central processing unit (vCPU) and a second vCPU of the VM, wherein the first vCPU and the second vCPU are mapped to the CPU,
determine an amount of time that the first vCPU is to be idle,
determine a host latency time for the host computer system in view of at least one of: a context switch associated with execution of the VM by the CPU, or an idle state of a hypervisor executed by the CPU;
modify the amount of time the first vCPU is to be idle by a performance multiplier corresponding to an average load of the CPU; and
responsive to determining that the amount of time the first vCPU is to be idle modified by the performance multiplier exceeds the estimate of the host latency time, halt the first vCPU while the second vCPU executes a request to place the CPU in a selected power state, wherein the selected power state satisfies at least one of the following conditions: that the idle time for the first vCPU divided by the performance multiplier does not exceed an exit time of the selected power state, or that the idle time for the first vCPU divided by the performance multiplier exceeds the exit time of the selected power state by a first positive delta.

11. The host computer system of claim 10, wherein the host latency time is a sum of at least two of the following times: a time for entering a first power state of the CPU, a time for exiting the first power state, a time for entering execution of the VM by the CPU, a time for exiting execution of the VM by the CPU, a time for the hypervisor to enter the idle state, or a time for the hypervisor to exit the idle state.

12. The host computer system of claim 10, wherein the first power state at least one of Advanced Configuration and Power Interface (ACPI) state C0, API state C1, ACPI state C2, or ACPI state C3.

13. The host computer system of claim 10, wherein the processing device is further to execute a busy loop on the first vCPU when the idle time for the first vCPU divided by the performance multiplier meets the host latency time.

14. The host computer system of claim 10, wherein the idle time for the first vCPU divided by the performance multiplier exceeds an exit time of a first power state of the CPU by a second positive delta and the first power state is one of a plurality of power states of the CPU also comprising the selected power state, the selected power state being different than the first power state, and wherein the selected power state of the plurality of power states satisfies a condition that the idle time for the first vCPU divided by the performance multiplier exceeds the exit time of the selected power state by the first positive delta that is at least as great as the second positive delta.

15. The host computer system of claim 10, wherein the processing device is further to identify the performance multiplier in view of a number of input/output wait tasks of the CPU.

16. A non-transitory computer readable storage medium, having instructions stored therein, which when executed, cause a processing device of a host computer system to:
identify, by the processing device, a guest operating system (OS) of a virtual machine (VM), the VM comprising a virtual central processing unit (vCPU) that is mapped to a central processing unit (CPU) of the host computer system;
determine an amount of time that the vCPU will be idle;
determine a host latency time for the host computer system in view of at least one of: a first power state of the CPU, a context switch associated with execution of the VM by the CPU, or an idle state of a hypervisor executed by the CPU, the idle time for the vCPU divided by the performance multiplier exceeds an exit time of a first power state of the CPU by a first positive delta, wherein the first power state is one of a plurality of power states of the CPU and a second power state of the plurality of power states satisfies at least one of the following conditions: that the idle time for the vCPU divided by the performance multiplier does not exceed an exit time of the other power state, or that the idle time for the vCPU divided by the performance multiplier exceeds an exit time of the other power state by a second positive delta that is at least as great as the first positive delta;
modify the amount of time the vCPU is to be idle by a performance multiplier corresponding to an average load of the CPU; and
responsive to determining that the estimate of the amount of time that the vCPU will be idle modified by the performance multiplier exceeds the estimate of the host latency time halt, by the processing device, the vCPU.

17. The non-transitory computer readable storage medium of claim 16, wherein the host latency time is a sum of at least two of the following times: a time for entering the first power state, a time for exiting the first power state, a time for entering execution of the VM by the CPU, a time for exiting execution of the VM by the CPU, a time for the hypervisor to enter the idle state, or a time for the hypervisor to exit the idle state.

18. The non-transitory computer readable storage medium of claim 16, wherein the processing device is further to:
   determine that the idle time for the vCPU divided by the performance multiplier exceeds the host latency time; and
   responsive to the determined send to the hypervisor a request to place the CPU in the first power state.

\* \* \* \* \*